April 11, 1961　　　S. M. MOBERG　　　2,978,705
MACHINE FOR APPLYING TAGS
Filed Feb. 11, 1959　　　　　　　　　　　　　7 Sheets-Sheet 1
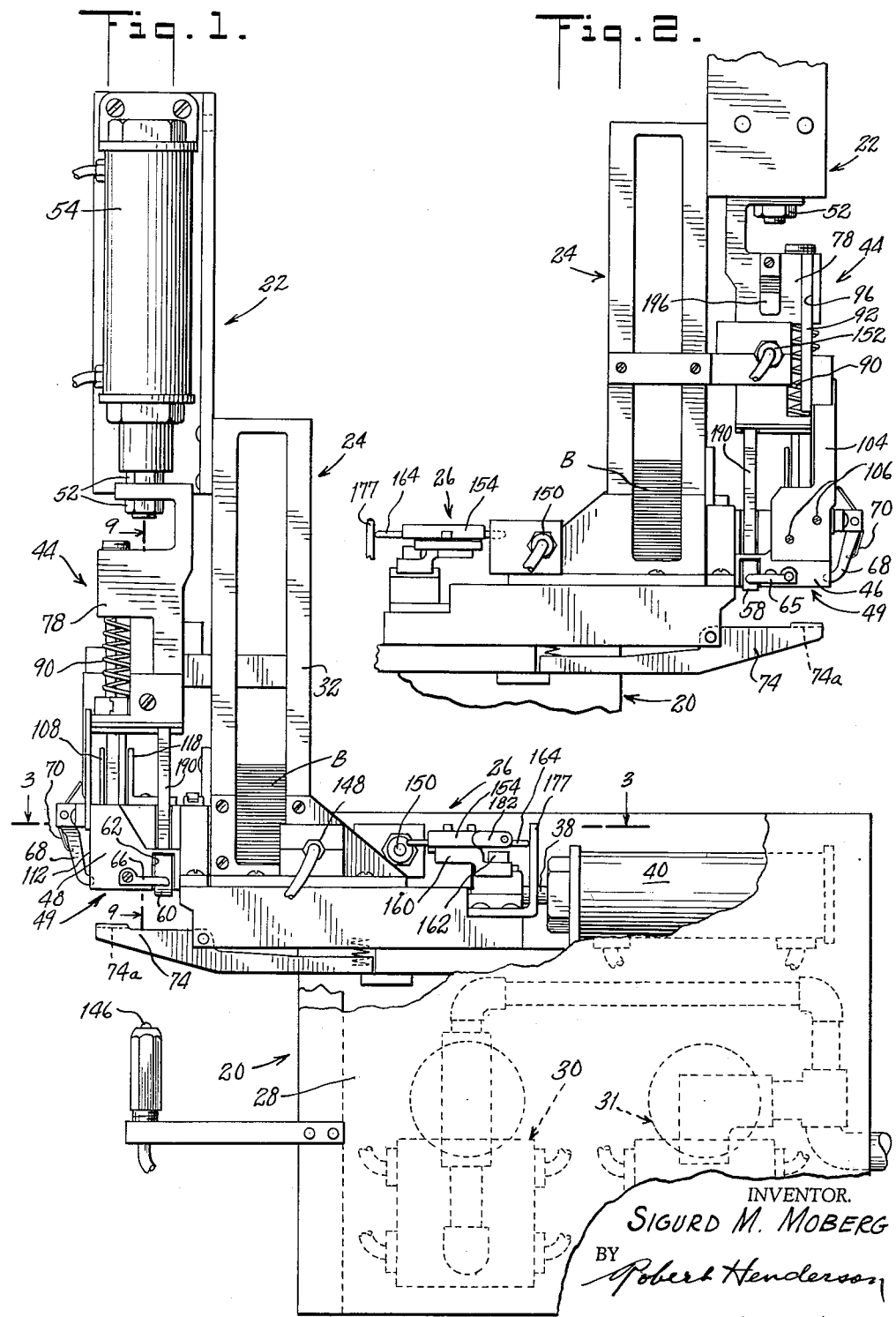
INVENTOR.
SIGURD M. MOBERG
BY Robert Henderson
ATTORNEY

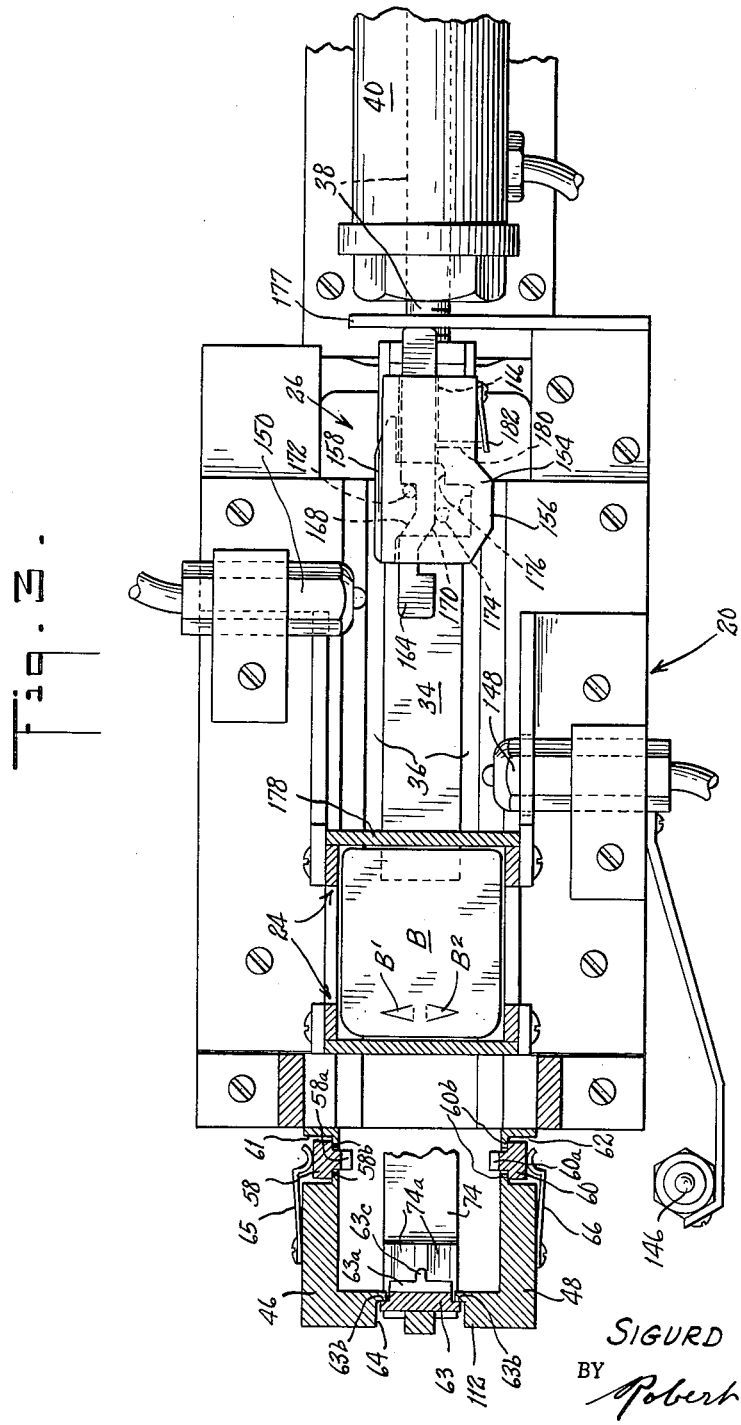

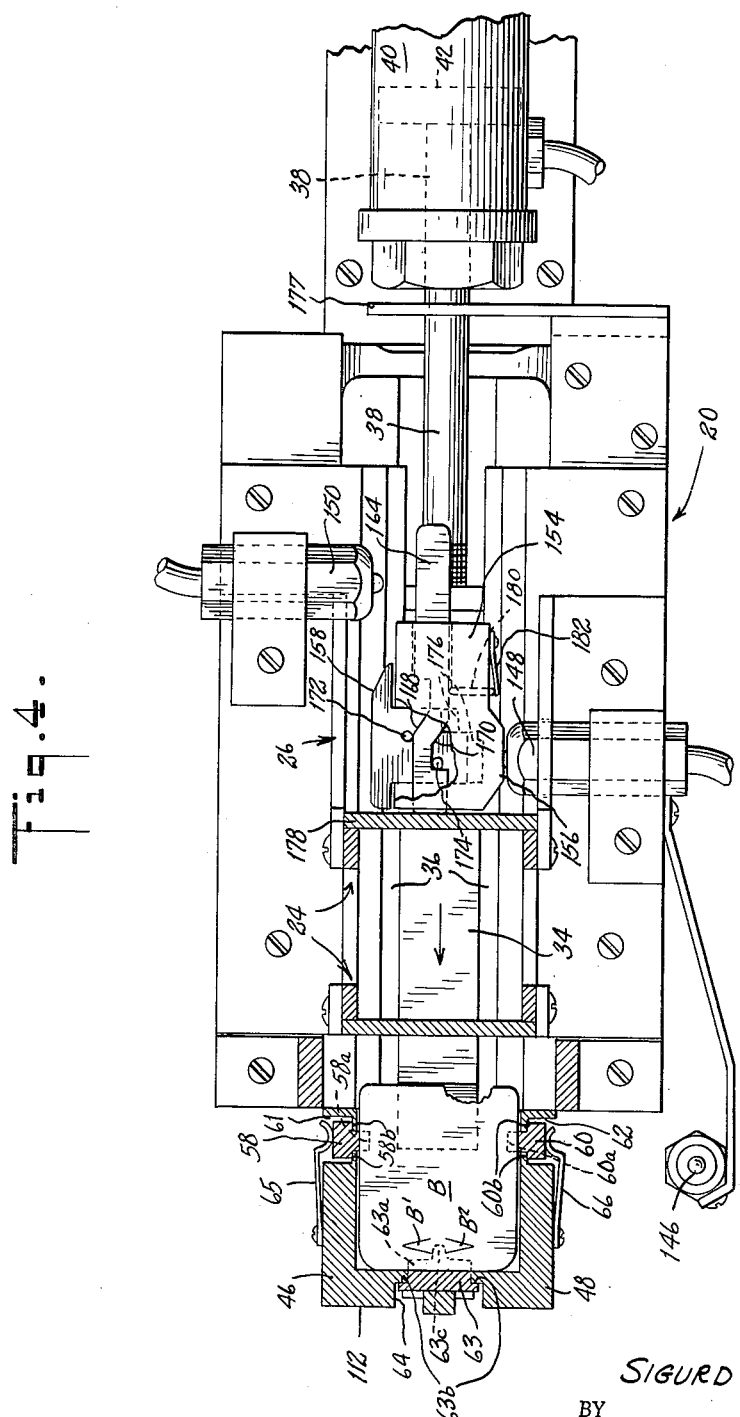

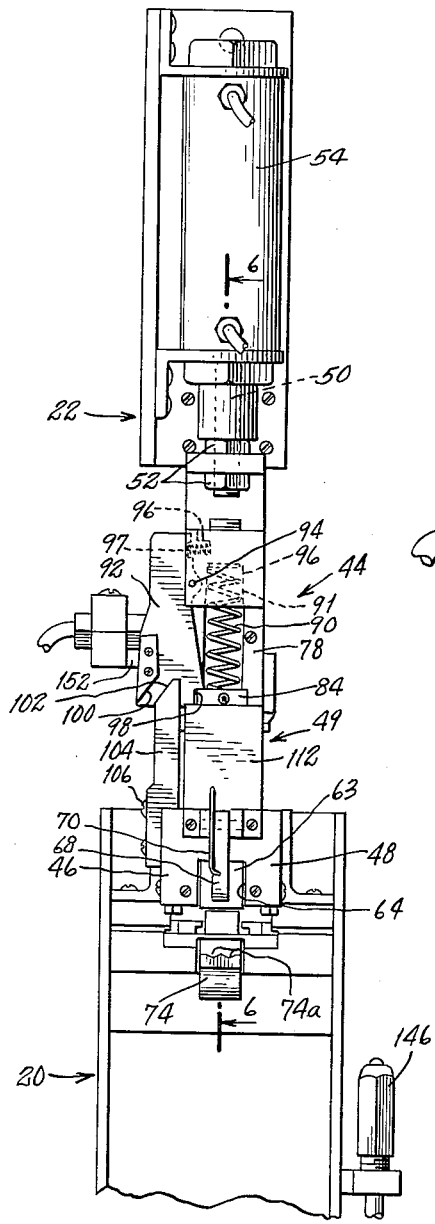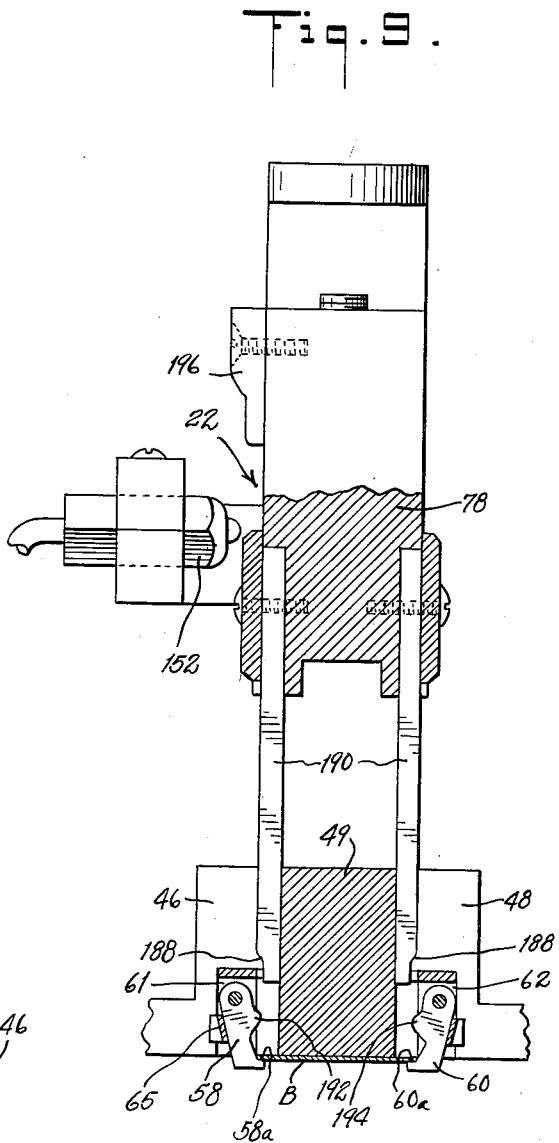

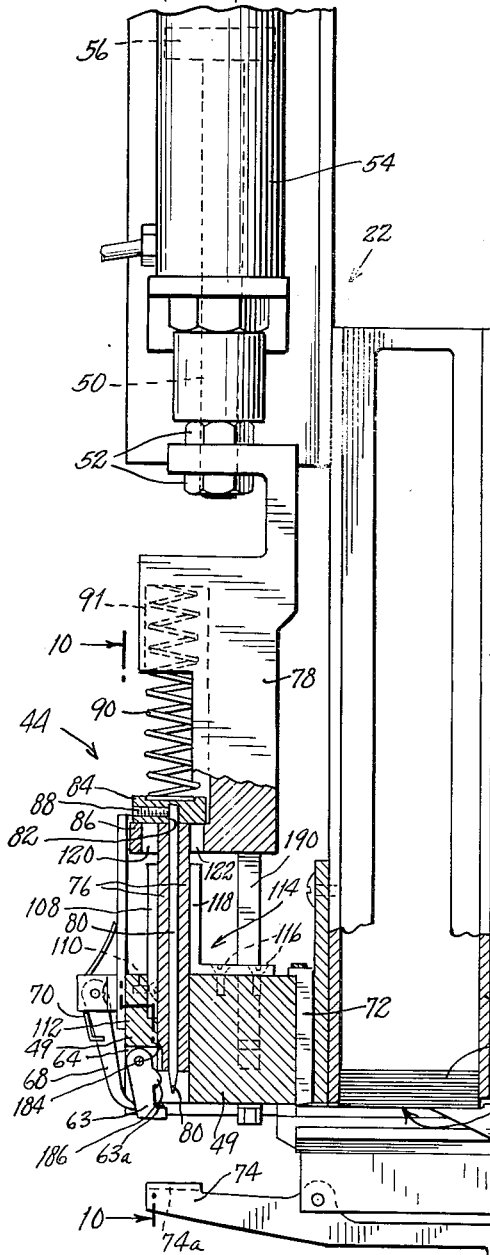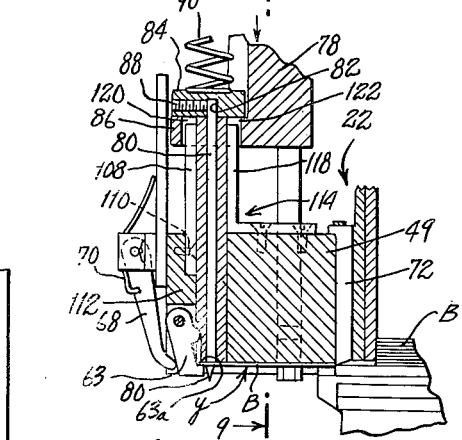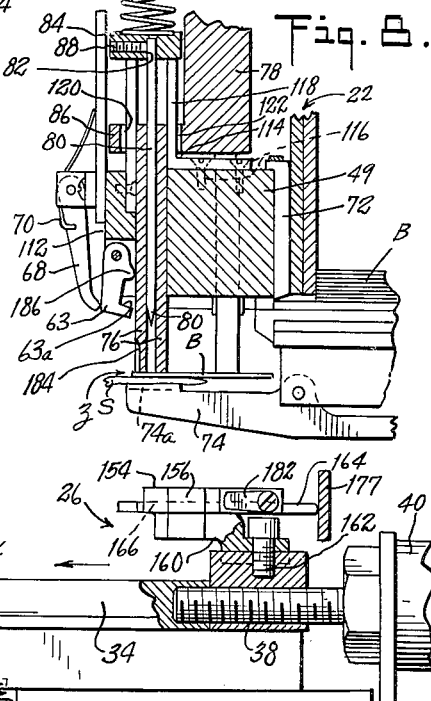

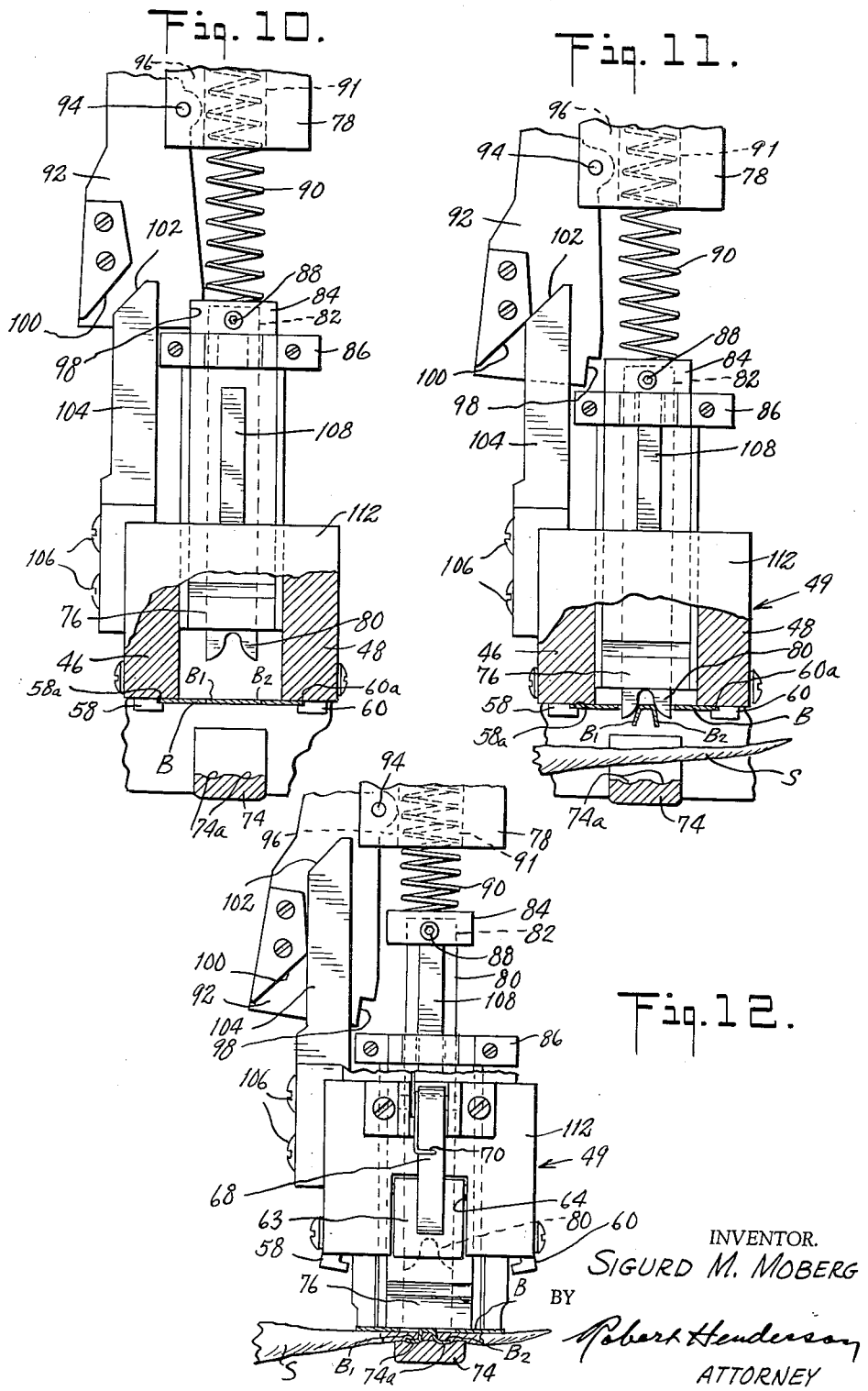

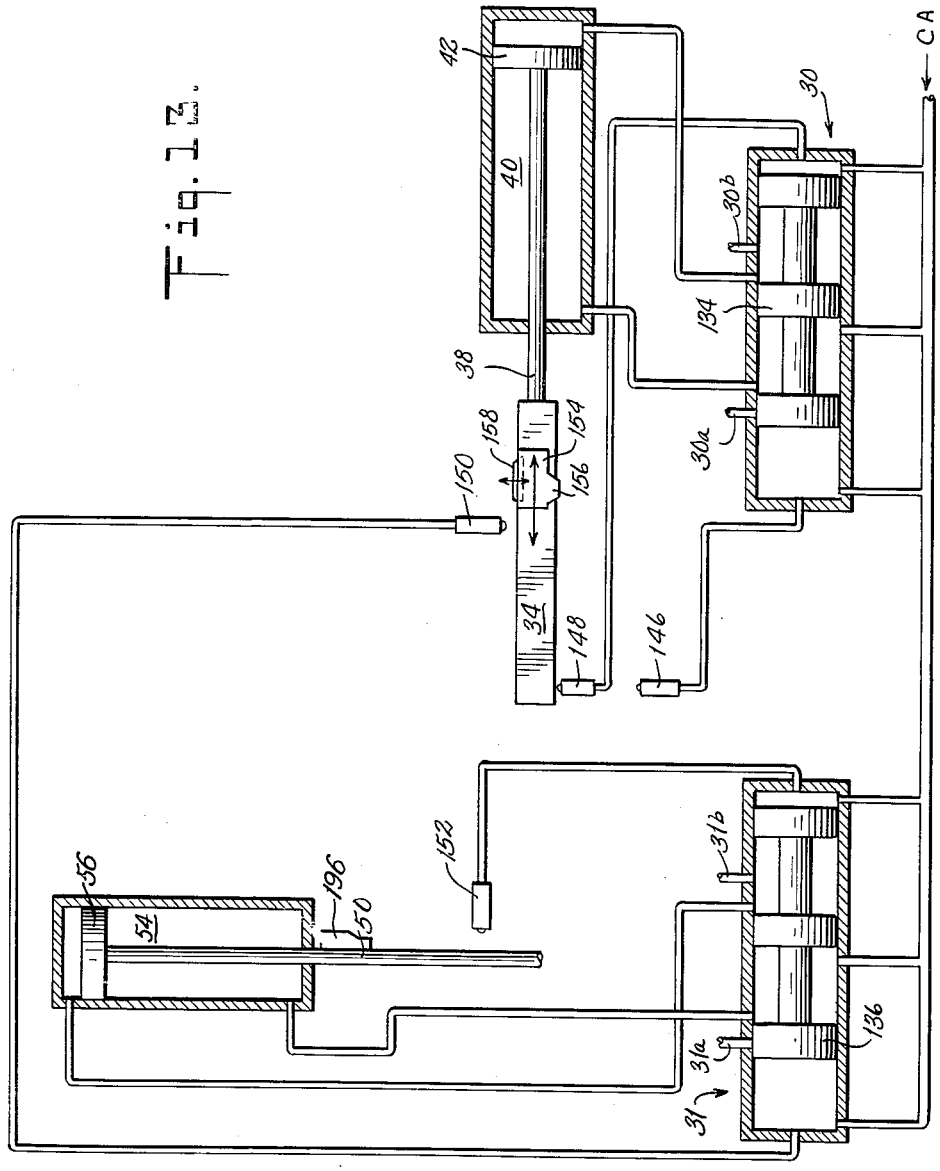

United States Patent Office 2,978,705
Patented Apr. 11, 1961

2,978,705

MACHINE FOR APPLYING TAGS

Sigurd M. Moberg, Pompton Plains, N.J., assignor to E. J. Brooks Company, Newark, N.J., a corporation of New Jersey Filed Feb. 11, 1959, Ser. No. 792,626

8 Claims. (Cl. 1—2)

This invention relates to a machine which is useful for applying tags to various types of articles. For illustrative purposes, the machine is disclosed herein with reference to the application of sheet-metal tags to dressed chickens, without, however, limiting the invention to a machine adapted for that one of the various uses in which the invention may be employed.

Some of the problems which are presented in applying tags to chickens are present in relation to the application of tags to other articles or materials, particularly in the sense that in applying tags to many materials, they are commonly applied by hand and under rather laborious and time-consuming conditions.

During the past several decades, the practice of applying tags to dressed chickens has grown for several reasons. One reason is that government inspection of chicken-processing plants and of dressed chickens has become quite common. Also, it has been desirable to apply tags to dressed chickens either for grading purposes or to indicate that the chickens have been processed in a government-inspected plant or that the chickens themselves have been inspected. Additionally, some processors of chickens desire to apply tags thereto displaying their name, trade-mark, etc.

Metal tags for dressed chickens have been preferred over tags of other materials, such as cardboard, probably because metal tags are better able to withstand association with the moist or wet chickens without deteriorating. Such tags for chickens, therefore, have commonly been made of sheet metal and have been of such character that they are clipped to the skin of the chicken by being bent manually to bring the parts of a catch on the tag together in association with the skin so that the tag will be clipped to the skin. Such metal tags heretofore in use can be very easily applied, but the operation of applying them manually in substantial volume entails considerable strain to the operator's hand and is very time-consuming, particularly in that an operator must continually reach into a box or other container of such metal tags and remove them from the container in order to apply them separately to chickens.

It appears to have been the belief that machine application of tags to chickens would be impractical, probably on the theory that it would be necessary to bring the chicken to the machine. Apparently, there has been no thought that a machine could be devised which, in a practical manner, could be maintained in immediate or close relation to the chickens being processed in order to apply tags thereto.

An important object of the present invention, therefore, is the provision of a machine for applying tags to chickens, or to other objects or materials.

Another important object is the provision of such a tag-applying machine of such character that it can readily be moved to the chickens, or other objects or materials, for the purpose of applying tags thereto.

Another important object is the provision of such a tag-applying machine having an arrangement wherein a supply of tags is directly associated with the machine in order to obviate the need for frequent replenishment of the tag supply.

Another important object is the provision of such a machine wherein the operation of the machine is initiated by the mere act of bringing a part of the machine into contact with the chicken or other object or material to which a tag is to be applied.

Another important object is the provision of such a tag-applying machine in which the operation, once initiated, goes on to completion automatically.

One possessing skill in the art relating to the application of tags to chickens or other articles will recognize, from the present disclosure of this invention, the existence of other more specific objects and advantages.

The objects hereinbefore referred to are achieved by a machine according to this invention, of which a single embodiment is disclosed, for illustrative purposes, in the accompanying drawings without, however, limiting the invention to the particular disclosed machine.

In the drawings:

Figure 1 is a side elevational view of a machine according to a preferred embodiment of this invention; a cover on said machine being partly broken away to enable certain interior parts to be more clearly shown.

Fig. 2 is a fragmentary, side elevational view of said machine, showing parts at the side thereof opposite to that shown in Fig. 1.

Fig. 3 is an enlarged, horizontal sectional view substantially on the line 3—3 of Fig. 1, showing tag-feeding portions of the machine and showing a tag in its position as before being moved from association with a tag-supply magazine (hereinafter referred to for convenience as the tag's "magazine position") to a position in which, by other instrumentalities in the machine, it may be applied to an article of poultry or other article (the latter position of the tag being hereinafter referred to for convenience as the tag's "applying position").

Fig. 4 is a view similar to Fig. 3, showing, however, the tag in its applying position and showing, by comparison with Fig. 3, the nature of movement which takes place in certain tag-feeding parts of the machine to move the tag from its Fig. 3 position to its Fig. 4 position.

Fig. 5 is an elevational view of the front end of the machine, i.e., as viewed from the left side of Fig. 1.

Fig. 6 is an enlarged, side elevational view of certain parts of the machine shown in Fig. 1, but differing from the latter figure chiefly in that certain parts have been broken away and sectionalized in a vertical plane on the line 6—6 of Fig. 5; this figure showing the machine with a tag about to be fed from its magazine position.

Fig. 7 is a fragmentary view of parts shown in Fig. 6, but showing the tag in its applying position and parts of the machine in changed positions.

Fig. 8 is a fragmentary view of the same parts shown in Fig. 7, but in their condition as upon the actual application of the tag to the chicken.

Fig. 9 is an enlarged, fragmentary, transverse, vertical sectional view, substantially on the lines 9—9 of Figs. 1 and 7.

Fig. 10 is a fragmentary, front elevational view, showing a prong-setting punch prior to its descent to set prongs in a tag in position to enter the skin of a chicken; certain parts in this figure being sectionalized substantially at the line 10—10 of Fig. 6.

Fig. 11 is a view similar to Fig. 10, showing the parts, however, as after the setting of the prongs of the tag for insertion into the chicken's skin.

Fig. 12 is a view similar to Figs. 10 and 11, but showing the parts as after piercing of the chicken's skin by the prongs of the tag and the swaging outwardly of said prongs to lock the tag to the chicken's skin.

Fig. 13 is a diagram of instrumentalities through which the machine automatically operates.

The machine as illustrated is designed to operate by compressed air, although, as the operation of most movable parts is of a reciprocatory character, it will be recognized that those parts may be operated, if desired, by other means as, for example, by electrical means wherein solenoidal actuation of reciprocating parts could be utilized.

The machine is provided with a rigid frame having two principal parts one of which, generally marked 20, is in the nature of a feed-mechanism support and the other of which is a die-mechanism support 22 which, through a magazine frame 24, is rigidly interconnected with the feed-mechanism support 20.

The support 20 serves not only to support a tag-feed mechanism, generally marked 26, but also serves to enclose, within suitable cover plates one of which is indicated at 28, certain necessary air valves which are generally indicated in broken lines at 30, 31 in Fig. 1. Said valves are controlled by certain control valves and serve to control the supply of compressed air to certain air cylinders which, in a manner hereinafter explained, function to actuate the various moving parts of the machine. The pipe connections of the valves 30, 31 and related instrumentalities are shown diagrammatically in Fig. 13.

The machine probably may best be made understandable by the explanation that the lowermost sheet-metal tag blank in a stack of tag blanks B contained within an upright gravity-type magazine 32 (see Fig. 6) is pushed from its magazine position, as indicated at x in Fig. 6, to its applying position, as indicated at y in Fig. 7, whence the tag is pushed downwardly by certain die operations to its attached position as indicated at z in Fig. 8, in which latter position it is securely fixed to the skin of the chicken.

The tag-feeding mechanism for achieving the mentioned horizontal movement of a tag blank from magazine position x to applying position y may best be understood by reference to Figs. 3 and 4, with some help perhaps by reference to Fig. 6. As shown in Figs. 3 and 4, the tag-feed mechanism includes a feeder slide 34 guided for horizontal movement in guides 36 and actuated through a plunger 38 which is threaded into the back end of the slide 34 and extends into a double-acting air cylinder 40, the back end of the plunger 38 being fixed to a piston 42, whereby reciprocatory motion is imparted to the slide 34 by the alternate action of compressed air introduced at opposite ends of the cylinder 40 in a well-understood manner. The means by which the operation of the cylinder 40 is controlled are hereinafter described in connection with the over-all control and operating means of the machine.

The tag-applying mechanism includes a punch assembly 44, guided for vertical movement in guide members 46, 48 (Figs. 10 and 11) of a guide block 49 and actuated by means of a plunger 50 (Figs. 5 and 6) to the lower end of which it is rigidly secured by nuts 52. The plunger 50 extends upwardly into a double-acting air cylinder 54, the upper end of the plunger 50 being suitably fixed to a piston 56, whereby reciprocatory motion is imparted to the punch assembly 44 by the alternate action of compressed air introduced at opposite ends of the cylinder 54 in a well-understood manner. The means by which the operation of the cylinder 54 is controlled are hereinafter described in connection with the over-all control and operating means of the machine.

The machine provides for the performance of a certain operation upon the tag blank while that blank is in applying position y, that operation being the pressing downwardly of two prongs by means of which the tag is to be secured to the skin of a chicken. The punch assembly performs that operation, but, to enable it to do so, it is essential that the tag blank be held, for a time, against dropping or otherwise moving downwardly from applying position y to its attached position z. For this purpose, pivotal tag-supporting fingers 58, 60 are mounted in suitable recesses or slots 61, 62 in opposite sides of the guide block 49, and a somewhat similar pivotal tag-supporting finger 63 is mounted in a suitable slot or recess 64 in the front of said guide block. The three fingers 58, 60, 63 are provided, respectively, at their lower ends, with ledges 58a, 60a and 63a which are positioned to receive and support a tag blank at the level at which that blank is received at applying position upon being fed from the magazine 32.

As may best be seen in Fig. 4, the fingers 58 and 60 are limited as to their inward pivotal movement by abutment portions 58b and 60b which abut portions of the guide block 49 so that the spacing between the fingers 58a and 60a immediately above their mentioned ledges is no less than the width of the tag blank to be received between those fingers. The fingers 58 and 60 are similarly urged inwardly by springs 65, 66.

Somewhat similarly to fingers 58 and 60, the finger 63 has abutment portions 63b (Fig. 3) for limiting its inward pivotal movement, and said finger is yieldably urged toward its innermost position by a pivotal arm 68 which is yieldably urged inwardly by a spring 70. The finger 63 also has an extension 63c which underlies a portion of the area of a tag blank between the latter's prongs B1 and B2 when the blank is in its applying position y to give localized support to the tag blank adjacent to the prongs when the latter are being pressed downwardly as in Fig. 11.

Although there is little or no likelihood that a tag blank in applying position y would shift rearwardly, the machine may include a positive safeguard against such rearward shifting by providing a stationary plate 72 at the back end of guide block 49 (Figs. 6, 7 and 8), the lower edge of which plate is beveled toward its back face to avoid interference with a tag blank moving toward applying position y, while the front extremity of the lower edge of said plate is low enough to form an abutment for engagement with a back edge of a tag blank when the latter is in applying position y on the ledges of the several supporting fingers.

The work of the punch assembly 44 is twofold: (1) to bend downwardly, as in Fig. 11, a pair of pre-cut prongs B1 and B2 from a coplanar relationship to the remainder of the tag blank B, and (2) to push the entire tag downwardly from its applying position y (Fig. 11) to cause the downwardly bent prongs B1 and B2 to engage a portion of chicken skin or flesh S between said prongs and an anvil 74 so that said prongs will pass through the skin S and then be swaged outwardly by engagement within swaging recesses 74a in the upper face of said anvil as in Fig. 12.

In order to perform the prong-swaging part of the twofold operation just referred to, the punch assembly 44 has a vertical swaging-punch member 76, the upper end of which is integral with a punch body 78 through which the punch assembly 44 is rigidly fixed to the lower end of the plunger 50 by the nuts 52, as already explained. Thus, the swaging-punch member 76 pursues a vertical movement with, and identical to, the movement of the plunger 50 in response to the operation of the piston 56 in the air cylinder 54.

In order to perform the prong-bending part of the mentioned twofold operation, the punch assembly 44 includes a vertical prong-setting punch 80 which is arranged to slide within and relatively to the swaging-punch member 76. The lower end of the prong-setting punch 80 is bifurcated, as best shown in Figs. 10–12, so that opposite sides of the lower end of said punch are adapted to engage the prongs B1 and B2 and press those prongs downwardly from the general plane of the blank B when the latter is in its applying position as shown in Fig. 11.

The upper end of the prong-setting punch 80, as may best be understood from Fig. 6, seats within a complementary recess 82 in the underside of a collar 84 disposed above a horizontal flange 86 of and at the lower end of the punch body 78, and said punch 80 is held rigidly within said recess by a set-screw 88. The swaging-punch member 76 is integral with the flange 86. A coil spring 90 is compressed between the upper face of the collar 84 and the upper end or bottom surface of a spring-seating recess 91 formed in the punch body 78 toward the latter's upper end.

As it is necessary or at least desirable for the prong-setting punch 80 to descend positively and operate positively to set the prongs B1 and B2 downwardly, a latch 92, pivoted at 94 in a vertical slot 96 in an upper portion of punch body 78, and urged toward latching position by a spring 97 (Fig. 5), is formed with a notch 98 in its lower end so that, at said notch, it overlies an adjacent edge of the collar 84. While thus positioned, the latch 92 deactivates the spring 90 or, i.e., holds said collar and the prong-setting punch against material movement relatively to the punch body 78 and the swaging-punch member 76.

At a certain point in downward movement of the punch assembly 44, a point approximately corresponding to the completion of the downward setting of the prongs B1 and B2, it is desired that the downward movement of the prong-setting punch 80 be discontinued, while the downward movement of the swaging-punch member 76 continues. To contribute to this result, the latch 92 is provided with a cam surface 100 which, in downward movement of the punch assembly, engages a sloping or beveled surface 102 at the upper end of an abutment arm 104 fixedly secured by screws 106 to, and extending upwardly from, the guide block 49, all as best understood from Fig. 11. Thus, as the punch assembly proceeds downwardly, the arm 104 pivots the latch 92 sidewisely, clear of the collar 84, so that the latter and the prong-setting punch may be prevented from descending further by means hereinafter described, while the punch body 78 and its integral swaging member 76 continue downwardly.

As the prong-setting punch 80, in the arrangement thus far described, could undesirably continue downwardly even after release of the latch 92, positive means are provided to stop the downward movement of said punch, said means comprising two stops, (1) an upright bar 108 (see Figs. 6–8), secured by a countersunk screw 110 within an inner recess of a front wall 112 of the guide block 49, and the other stop being an angle member 114 which is fastened by countersunk screws 116 upon the top face of the guide block 49. The stop bar 108 and an upright arm 118 of the angle member 114 extend upwardly, the bar 108 in front of the swaging-punch member 76 and the upright arm 118 in back of said swaging-punch member. The stop bar 108 and the stop arm 118 extend upwardly to the same extent and, respectively, extend into and through openings 120 and 122 in the flange 86 of the punch body 78 so that, as the punch body 78 descends, the upper ends of the bar 108 and the arm 118 abut the underside of collar 84, thereby positively limiting the downward movement of said collar as well as the downward movement of the prong-setting punch 80. The approximate lowest possible movement of the punch 80 is as shown in Figs. 7, 8 and 11.

Piping and air valves by means of which compressed air is utilized to operate this machine are not per se the present invention. Therefore, the details of such instrumentalities are not set forth herein. However, as the compressed air circuits and instrumentalities therein or cooperating therewith are utilized in a special manner, to bring about the desired operation of this machine, they are shown diagrammatically in Fig. 13.

Referring to Fig. 13, CA represents a source of compressed air at suitable pressure, say 30 p.s.i., which is connected to a circuit of piping, as shown in said figure. The illustrated circuit includes the air cylinders 40 and 54, and main control valves 30 and 31, which may be of a type having therein, respectively, free piston-type valve elements 134, 136, and exhaust ports 30a, 30b and 31a, 31b. Said circuit also includes pilot-control valves which are in the nature of exhaust valves 146, 148, 150 and 152 by means of which delivery of pilot supplies of compressed air to valves 30, 31 is controlled to shift the valve elements 134, 136 back-and-forth in a proper manner, whereby to control the delivery of compressed air to the air cylinders 40 and 54, and thereby effect desired reciprocatory movements of the plungers 38 and 50. Those skilled in the art relating to pneumatic instrumentalities and controls will undoubtedly perceive from Fig. 13 the manner in which operation of the cylinders 40 and 54 is achieved. However, the over-all operation of the machine is hereinafter fully described.

Pilot-control valve 146 is operated by contact therewith of a part of a chicken to which a tag is to be applied. Pilot-control valve 148 is operated by a cam portion 156 of a cam member 154, integral with a bracket 160 which is held rigidly by a screw 162 to the back end of the feeder slide 34. Pilot-control valve 150 is operated by a transversely shiftable cam plate 158 slidably mounted in a suitable recess 176 in bracket 160 and constrained to move with the latter and with the feeder slide 34.

An elongate cam-plate shifter 164 is mounted and guided for sliding in a recess 166 (Figs. 3 and 6) in the underside of the cam member 154. An intermediate portion of the shifter 164 is shaped to provide a cam portion having opposed cam surfaces 168, 170 which, to shift the cam plate 158 laterally when shifter 164 is slid longitudinally in relation to the cam member 154, cooperate respectively with studs 172, 174 which are rigidly fixed into the cam plate and extend upwardly therefrom to positions at opposite sides of the shifter 164.

The mentioned longitudinal shifting of the shifter 164 is accomplished by abutment means in the form of stationary stop members 177, 178 which are effective at opposite ends of the reciprocatory movements of the slide 34. As the feeder slide 34 pursues the latter part of its retraction movement, stop member 177 arrests the corresponding movement of the shifter 164, thereby sliding the latter forwardly relatively to the cam plate 158 so that cam surface 170 of the shifter engages stud 174 to push the cam plate laterally (downwardly as viewed in Figs. 3 and 4) to non-interfering position in relation to valve 150 so that the latter will not be operated on a subsequent forward stroke of the feeder slide. Stop member 178 functions at the latter part of the feeder slide's forward movement to cause opposite movement of the shifter 164 relatively to the cam plate 158 and causing the shifter's cam surface 168 to engage stud 172 and push the cam plate laterally in an opposite direction (upwardly as viewed in Figs. 3 and 4) to position the cam plate to operate valve 150 on an ensuing retraction movement of the feeder slide. A snubbing or friction pin 180, slidable in a suitable transverse bore in cam member 154, is urged by a spring 182 against one side of the shifter 164, thereby frictionally preventing shifting of the shifter except in response to cooperation with the stop members 177 and 178 as just described.

Before summarizing the operation of this machine, it should be remarked that valves such as are diagrammed at 30 and 31 of Fig. 13 operate on the principle that if air pressure is relieved or reduced at one end of the valve, the valve element 134 or 136, or equivalent valve element, will shift toward the end at which pressure is thus relieved; and where, as here, means are provided for relieving pressure at either end of a valve, the valve element may be shifted in either of opposite directions in the valve casing. It should be understood also that such opposite shifting of such a valve element controls delivery of air to a related cylinder 40 or 54 to cause operation of a piston in the cylinder.

Before each usage of the disclosed machine, the cam plate 158, the valves 30 and 31 and the pistons 42 and 56 in air cylinders 40 and 54, controlled respectively by said valves, are in their positions indicated in Fig. 13.

To apply a tag to a chicken, a portion of the chicken's skin S is inserted in the jaw-like space between the guide block 49 and the anvil 74 and at about the same time the operator causes another part of the chicken to momentarily touch the operating button of valve 146 which is immediately adjacent to said jaw-like space. Such touching of said button and consequent operation of the valve 146 causes instantaneous affixation of a tag to the chicken's skin because of wholly automatic operation as follows:

Such momentary operation of valve 146 relieves air pressure at the left side of valve 30 (Fig. 13), causing valve element 134 to shift leftwardly and, in consequence, causing piston 42 to move the feeder slide 34 forwardly to push the undermost tag blank B from magazine 32 to applying position y (Fig. 7). At the latter part of this forward movement of the slide 34, cam portion 156 momentarily operates valve 148 to relieve air pressure at the right side of valve 30, causing valve element 134 to shift rightwardly and, in consequence, causing piston 42 to retract the feeder slide 34. Also, at the latter part of the forward movement of the slide 34, the shifter 164, in the manner already described, shifts cam plate 158 from its non-interfering to its interfering position in relation to valve 150 so that the latter is operated by cam plate 158 as the slide 34 approaches its fully retracted position. This operation of valve 150 relieves air pressure at the left end of valve 31, thereby shifting the latter's valve element 136 to cause piston 56 of air cylinder 54 to descend to force the punch assembly 44 downwardly.

In such downward movement of the punch assembly, the bifurcated lower end of the prong-setting punch 80 pushes the tag's prongs B1 and B2 downwardly as in Fig. 11, this occurring while the tag blank is held up in its applying position y by the ledges 58a and 60a of fingers 58 and 60 and ledge portions 63a and 63c of finger 63. Upon descent of the punch assembly, sufficiently to bring about such setting of the tag's prongs, the latch 92 disengages collar 84, and stops 108 and 118 abut the underside of said collar so that downward movement of the latter and of prong-setting punch 80 is positively arrested.

At about the time that such arresting takes place, a cam surface 184 (Figs. 6–8) on still descending swaging-punch member 76 pushes outwardly against a cam projection 186 on finger 63 to pivot the latter from under the tag blank. At the same time, cam surfaces 188 at the lower ends of cam rods 190, depending from punch body 78 (Fig. 9), push outwardly against cam projections 192 and 194 on fingers 58 and 60 to pivot the latter from under the tag blank. This outward pivoting of the fingers 58, 60 and 63 frees the tag blank to descend, which it does, followed intimately by the descending swaging-punch member 76. The latter forces the tag's prongs B1 and B2 through the skin S into engagement within the anvil's swaging recesses 74a which force said prongs outwardly and upwardly into clinching engagement with the skin. The tag may easily be removed, when desired, by merely lifting it away from the skin. Such lifting causes the prongs to unbend to release the tag from the skin; but such lifting and consequent separation of the tag from the skin does not occur except by a person's deliberate action.

At or near the completion of the downward movement of the punch assembly 44, a cam member 196 (Figs. 2 and 9) engages and momentarily operates control valve 152, relieving air pressure at the right end of valve 31, causing the latter's valve element 136 to shift rightwardly. This reverses the pressure conditions at opposite sides of the piston 56, causing the latter to retract, completely, the punch assembly 44, freeing the chicken skin for removal from the machine and leaving the latter in condition to perform, similarly, another similar tax-applying cycle of operations. It will be understood by those familiar with compressed-air motor means that the described operating sequences occur practically instantaneously after the described momentary operation of the valve 146.

Without attempting to recite the many possible variations of this invention, certain features should be mentioned.

Although the drawings show valves 30 and 31 within a housing rigidly associated with the tag feed and punch mechanisms, those valves, and the housing therefor, may be disposed remotely from the tag feed and punch mechanisms, the latter mechanisms being connected to said valves and the source of compressed air by multiple pipes, preferably flexible and preferably held together as a single air-supply pipe assembly.

The machine may either be suitably mounted in a fixed position and the chickens brought to the machine or it may be freely movable by an operator to the chickens. If, as is quite common, the chickens are processed or dressed at a conveyor, the machine may be suspended by a flexible cable (not shown) to hold it near to the conveyor so that an operator may easily move the machine to the extent necessary to apply tags to chickens on the conveyor.

It should be obvious that this invention may be practiced in various other embodiments without, however, departing from the invention as set forth in the following claims.

I claim:

1. A tag-applying machine comprising a magazine adapted to hold a stack of tag blanks in an upright position, a feeder element reversibly movable substantially horizontally, transversely of such a stack and adapted to laterally push a blank from said stack to an applying position, an anvil underlying and spaced from said applying position, punch means movable substantially vertically in line with said anvil, a reciprocating motor for vertically moving said punch means, control means for said motor, arranged to operate in response to said movement of said feeder element, to cause said vertical movement of said punch means and coaction of the latter with said anvil to angularly bend portions of downwardly extending prong means on such a blank, and pivotal, blank-supporting fingers for supporting a tag blank in said applying position.

2. A machine according to claim 1, said blank-supporting fingers having portions adapted for engagement by said punch means upon downward movement of the latter to pivot said fingers to non-blank-supporting positions and thereby permit a blank to drop from said applying position and toward said anvil.

3. A tag-applying machine comprising a magazine adapted to hold a stack of tag blanks in an upright position, a feeder element reversibly movable substantially horizontally, transversely of such a stack and adapted to laterally push a blank from said stack to an applying position, an anvil underlying and spaced from said applying position, and punch means, movable substantially vertically in line with said anvil, in response to said movement of said feeder element, and adapted to coact with said anvil to angularly bend portions of downwardly extending prong means on such a blank, said machine further including a reversible motor for operating said feeder element, manually operable, advance-control means for operating said motor to initiate a feeding stroke of said feeder element, and automatically operable, retraction-control means, coacting with said feeder element toward the end of the latter's feeding stroke for operating said motor to initiate a retraction stroke of said feeder element.

4. A machine according to claim 3, further including a second reversible motor for operating said punch means, punch-advance-control means for operating said second motor to initiate an advance stroke of said punch means, cam means, carried by said feeder element, for operating said retraction-control means and said punch-advance-control means, and shifting means, operable toward opposite ends of the feeder element's opposite strokes, for shifting a portion of said cam means laterally to adapt the cam means to operate said punch-advance-control means in response only to retraction movement of the feeder element.

5. A machine according to claim 4, said shifting means comprising a shifter member, carried by said feeder element and slidable relatively to said feeder element in substantial parallelism with the latter's line of movement, and stationary stop members coacting with said shifter member to terminate the latter's movements in opposite directions prior to termination of corresponding movements of the feeder element; said laterally shiftable portion of said cam means and said shifter member having cam surfaces which coact, upon such relative movement of the shifter member and the feeder element, to cause lateral shifting of the said shiftable portion of the cam means in opposite directions.

6. A tag-applying machine comprising a magazine adapted to hold a stack of tag blanks in an upright position, a feeder element reversibly movable substantially horizontally, transversely of such a stack and adapted to laterally push a blank from said stack to an applying position, an anvil underlying and spaced from said applying position, and punch means, movable substantially vertically in line with said anvil, in response to said movement of said feeder element, and adapted to coact with said anvil to angularly bend portions of downwardly extending prong means on such a blank, said machine further including a reversible motor for operating said punch means, advance-control means for operating said motor to initiate an advance stroke of said punch means toward said anvil, means carried by said feeder element and coacting with said advance-control means during a retraction stroke of said feeder element for operating said advance-control means to automatically initiate said advance stroke of the punch means.

7. A machine according to claim 6, further including automatically operable, retraction-control means, coacting with said punch means toward the end of the latter's advance stroke for operating said motor to initiate a retraction stroke of said punch means.

8. A machine according to claim 7, further including a reversible motor for operating said feeder element, manually operable, advance-control means for operating the latter motor to initiate a feeding stroke of said feeder element, and automatically operable, retraction-control means, coacting with said feeder element toward the end of the latter's feeding stroke for operating the latter motor to initiate a retraction stroke of said feeder element.

References Cited in the file of this patent

UNITED STATES PATENTS

| | | |
|---|---|---|
| 628,508 | Woerner | July 11, 1899 |
| 970,314 | Grimes | Sept. 13, 1910 |
| 1,481,867 | Holbrook | Jan. 29, 1924 |
| 1,556,370 | Stiriss | Oct. 6, 1925 |
| 2,026,783 | Hall | Jan. 7, 1936 |
| 2,308,919 | Hitt | Jan. 19, 1943 |
| 2,314,184 | Zeruneith | Mar. 16, 1943 |
| 2,765,468 | Cootes | Oct. 9, 1956 |
| 2,886,815 | Young | May 19, 1959 |

Dedication 2,978,705.—*Sigurd M. Moberg*, Pompton Plains, N.J. MACHINE FOR APPLYING TAGS. Patent dated April 11, 1961. Dedication filed Feb. 9, 1972, by the assignee, *E. J. Brooks Company*.

Hereby dedicates to the Public the term thereof remaining after Oct. 1, 1970.

[*Official Gazette June 27, 1972.*]